United States Patent

[11] 3,622,363

| [72] | Inventor | Edward M. Van Dornick<br>9400 Whitmore St., El Monte, Calif. 91731 |
|---|---|---|
| [21] | Appl. No. | 827,592 |
| [22] | Filed | May 26, 1969 |
| [45] | Patented | Nov. 23, 1971 |

[54] REDUCTION OF ALKALI IN CEMENT PRODUCTION
9 Claims, 1 Drawing Fig.

| [52] | U.S. Cl. ................................................... | 106/100, 263/53 |
|---|---|---|
| [51] | Int. Cl. ........................................................ | C04b 7/36 |
| [50] | Field of Search........................................... | 106/100; 263/53 |

[56] References Cited
UNITED STATES PATENTS

| 2,776,132 | 1/1957 | Pyzel............................. | 263/53 |
| 3,317,201 | 5/1967 | Muller et al. ................. | 263/53 |
| 3,451,665 | 6/1969 | Strassen ....................... | 106/100 |

*Primary Examiner*—James E. Poer
*Attorney*—White & Haefliger

ABSTRACT: Hydraulic cements, including Portland cements, are produced to be alkali-free by calcination of finely ground raw mix fed to a columnar reaction zone wherein the reactants are fluidized by the introduction of air and fuel, the reaction zone gaseous effluent containing volatilized alkali being subjected to quench cooling to a temperature at which the alkali desublimes and becomes separable from the gas.

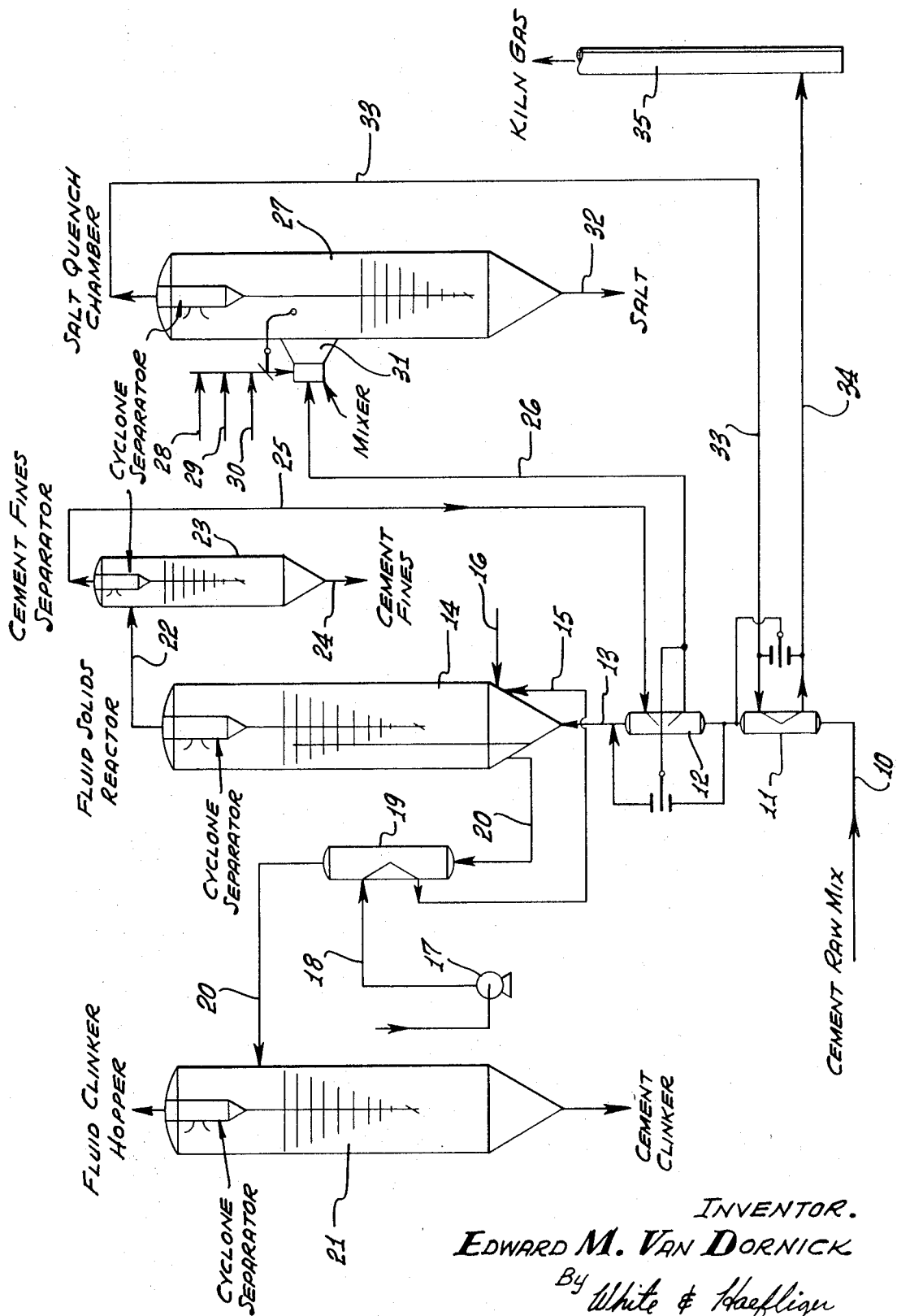

REDUCTION OF ALKALI IN CEMENT PRODUCTION

BACKGROUND OF THE INVENTION

The presence of alkali in cements results in concretes made from such cements which are structurally inferior to alkali-free cements and additionally have tendencies to spall and flake unacceptably to cement users. Present-day use of cement is dependent upon a first-quality material in order to fulfill the structural strength and architectural aesthetics currently in demand in the use of cement for decorative and structural purposes.

Cement production in the United States is in excess of 300 million barrels per year and in order to provide the raw materials for this huge requirement it is becoming increasingly necessary to utilize lower grade feed stocks or to seek raw materials at greater distances from the point of cement manufacture. As a result, raw materials and production costs have increased appreciably even to maintain the alkali content of the product within acceptable limits, and the costs would be additionally increased if attempts were made by present means to completely eliminate the alkali content. On the other hand, removal of the alkali content of the raw materials to permit use of the most readily available feed stocks regardless of their alkali salt content, would be most attractive and profitable to the cement manufacturers. The present invention accomplishes this result in that it will permit the use of essentially any reasonable alkali salt content feed stock and produce an alkali-free product.

In the processing of cement the raw materials are ground to below 200 mesh and calcined principally in rotary kilns to a maximum temperature of 2,650° F., this temperature being sufficient to completely volatize i.e., sublime, all of the alkali salt present, particularly sodium chloride and potassium chloride. At the temperature of the kiln gases these chlorides decompose and reoxidize to form the corresponding sodium and potassium oxides. Upon cooling or on being brought in contact with cold materials such as cold kiln feed or product, these alkali oxides condense to solids and are carried by the feed or product through the kiln so that when later mixed with water they form the corresponding hydroxides which react with the aggregates and silicates of the cement to produce structural weaknesses and spalling.

It has also been proposed to calcine finely ground cement raw mix within a vertically extended reactor wherein the solids are maintained in an agitated fluidized bed state by the introduction to the zone of preheated combustion air along with fuel. In this type of process it has been proposed to reduce or eliminate the alkali oxides by calcining at a temperature above the alkali sublimation temperature, and cooling the reaction zone effluent to an alkali desublimation temperature by passage of the gases through tubular heat exchangers. To my knowledge such processes have not been operative in practice because of clogging or fouling of the exchangers by the desublimed alkaline compounds.

SUMMARY OF THE INVENTION

The present invention has for its general object to provide in conjunction with cement production by the fluidized bed type process, for virtually complete volatile alkali elimination by a simple method permitting free separation and recovery of the alkali oxides from the reaction zone effluent.

More specifically, the invention aims to achieve the alkali separation by quenching the high temperature reaction zone effluent by admixture with a coolant, thus to lower the temperature of the quenched gases to an extent that desublimation of the alkali will occur and preferably in a manner rendering the alkali recoverable in dry powdery form.

In accordance with the invention, gases from the reaction zone first may be passed through a cement dust or fines separator and then mixed with a fluid, preferably air, coolant and the mixture introduced to an enlarged quench chamber in which the alkalis desublime and precipitate in a finely divided state, possibly resembling snow, the solids settling and cyclone separating within the quench chamber so as to be flowable therefrom and separable from the quenched gas stream.

As will appear, following the cement fines separation and in advance of quenching the high temperature gases may be heat exchanged with a raw mix stream flowing to the reactor, and following the salt precipitation the quenched gas stream also may be heat exchanged with the raw cement mix stream to the reactor.

The foregoing and further features of the invention will be readily understood from the following detailed description of the accompanying drawing illustrative of the process diagrammatically and in flow sheet form.

DESCRIPTION OF THE PREFERRED EMBODIMENTS

Hydraulic or Portland cement raw mix composed of finely ground argillaceous and calcarious materials are fed from line 10 through exchangers 11 and 12 and introduced through line 13 into the base of the fluid solids reactor 14 to which air and fuel are introduced respectively through lines 15 and 16. The air for combustion is preheated in being displaced by blower 17 via line 18 through exchanger 19, the preheat being supplied by hot clinker discharge from the reactor through line 20, the exchanger 19 and into the clinker hopper 21.

The preheated air and usually gaseous fuel in the reaction zone plus the combustion products and decomposition products are at a combined velocity sufficiently high to maintain the raw mix, finely ground typically to −200 mesh, in a state of ebullient agitation and solid particle suspension sufficient to fluidize, i.e., render fluent, the solids bed undergoing calcination and conversion to cement clinker which flows from the reactor through line 20. Other than to the extent described, the further details of the reactor operation per se need not be described for purposes of the present invention but may be found in the Pyzel U.S. Pat. No. 2,776,132 issued Jan. 1, 1957 on Cement Manufacture.

High temperature combustion gases, typically at about 2,600° F., leave the reactor through line 22 and first pass through the fines separator 23 within which entrained cement particles are separated for removal through line 24. In the reactor, the alkaline compounds volatilize or sublime and are carried by the reactor effluent through the fines separator, line 25 and exchanger 12 for delivery through line 26 to the quench chamber 27. The latter is sufficiently enlarged in volume as to permit of no clogging by the compounds undergoing desublimation, thus assuring continuous and trouble-free salt removal and recovery in the quench stage. The line 16 reactor effluent is quenched by admixture with a fluid coolant, either air from line 28, water or steam from line 29, or mixtures of these, to which may be added if desired some of the finely divided salt recovery fed through line 20. The fluid coolant enters mixer 31 to be intimately and thoroughly combined with the hot gases and the admixture then discharged into the quench chamber 27.

As to the alkali salt or oxide vapors in the kiln gases, it has been found that at atmospheric pressure the desublimation occurs in the range of about 1,500° F. down to about 1,000° F. for a kiln gas having a salt concentration in the range of 0.003 mol. fraction which corresponds to a partial pressure of 2.28 millimeters. This salt content results typically from a reaction zone feed salt content of 0.75 weight percent; similarly the vaporous salt condensation resulting from raw mix containing 1.5 percent salt content is at about 1,500° F.; 3 percent salt content at about 1,600° F. and 6 percent salt content 1,700° F. Quenched to a temperature in about the 1,700° to 1,000° F. range the alkaline compounds tend to condense in the manner of snow and are readily recoverable through the quench chamber outlet 32.

The quenched gas stream leaving the quench chamber through line 33 may be heat exchanged with the raw mix fed by passage through exchanger 11 and then sent through line 34 to the stack 35.

I claim:

1. In hydraulic cement production, the method that includes continuously introducing finely ground raw hydraulic cement forming and alkali producing materials to a vertically oriented column forming a reaction zone, feeding hot air and fuel to a lower location in the zone at a gas velocity sufficiently high to maintain said raw materials in an ebullient agitated fluidized state while heating the materials to cement clinker-forming temperature in excess of 2,000° F. at which alkali compounds volatilize from the cement reactants, continuously withdrawing particulate clinker from the fluidized mass, removing combustion and reaction gases with entrained cement fines and sublimed alkali from said zone, separating entrained cement fines, admixing the gases with a fluid coolant to quench the gases and openly precipitate the alkalis in gas-suspended particulate form within an enlarged quenching zone at a temperature at which the alkali desublimes and removing the alkali from the quenching zone.

2. The method of claim 1, in which the reaction zone gases are quenched in a manner productive of snowlike crystalline alkali which gravitates and separates from suspension in the quenching zone.

3. The method of claim 1, in which the reaction zone effluent gases are quenched first by admixture with the fluid coolant and then are discharged into said enlarged zone.

4. The method of claim 3, in which said coolant is air.

5. The method of claim 1, in which cement fines are separated from the reaction zone effluent gases in advance of the quenching zone.

6. The method of claim 5, in which the gases after the fines separation are heat exchanged with said raw materials being fed to the reaction zone.

7. The method of claim 5, in which the gases from the quenching zone are heat exchanged with said raw materials being fed to the reaction zone.

8. The method of claim 6, in which the gases from the quenching zone are heat exchanged with said raw materials being fed to the reaction zone.

9. The method of claim 1 in which cement clinker from the reactor is heat exchanged with combustion air to the reactor.

* * * * *